United States Patent
Yamamoto

(10) Patent No.: US 11,921,619 B2
(45) Date of Patent: Mar. 5, 2024

(54) PROGRAMMING DEVICES AND PROGRAMS FOR CREATING AND EDITING PROGRAMS USED FOR IMAGE PROCESSING

(71) Applicant: Trust Technology Co., Ltd., Tokyo (JP)

(72) Inventor: Ryuichirou Yamamoto, Tokyo (JP)

(73) Assignee: TRUST TECHNOLOGY CO., LTD., Tokyo (JP)

( * ) Notice: Subject to any disclaimer, the term of this patent is extended or adjusted under 35 U.S.C. 154(b) by 344 days.

(21) Appl. No.: 17/297,129

(22) PCT Filed: Nov. 22, 2019

(86) PCT No.: PCT/JP2019/045768
§ 371 (c)(1),
(2) Date: May 26, 2021

(87) PCT Pub. No.: WO2020/110933
PCT Pub. Date: Jun. 4, 2020

(65) Prior Publication Data
US 2022/0058110 A1 Feb. 24, 2022

(30) Foreign Application Priority Data
Nov. 28, 2018 (JP) ................................ 2018-222247

(51) Int. Cl.
*G06F 11/36* (2006.01)
*G06F 3/0482* (2013.01)
*G06F 8/34* (2018.01)

(52) U.S. Cl.
CPC ........ *G06F 11/3644* (2013.01); *G06F 3/0482* (2013.01); *G06F 8/34* (2013.01)

(58) Field of Classification Search
CPC ....... G06F 11/3644; G06F 3/0482; G06F 8/34
(Continued)

(56) References Cited

U.S. PATENT DOCUMENTS 5,631,974 A * 5/1997 Lau-Kee .................. G06T 19/00
382/302
7,134,090 B2 * 11/2006 Kodosky ................... G06F 8/61
715/826

(Continued)

FOREIGN PATENT DOCUMENTS

JP 4-365179 12/1992
JP 2003-67766 3/2003
(Continued)

OTHER PUBLICATIONS

Baudisch, Patrick, et al. "Drag-and-Pop and Drag-and-Pick: Techniques for Accessing Remote Screen Content on Touch-and Pen-Operated Systems." Interact. vol. 3. 2003.pp.1-8 (Year: 2003).*

(Continued)

*Primary Examiner* — Satish Rampuria
(74) *Attorney, Agent, or Firm* — GREENBLUM & BERNSTEIN, P.L.C.

(57) ABSTRACT

A programming device which is capable of creating a program, typified by an image processing algorithm, and of easily validating a program being edited, and a program are provided.
The programming device edits a program by arranging icons of units, the unit representing a processing unit, and linking the units on an editing screen in response to a user operation. The programming device includes program execution means for executing a program defined by the units arranged and linked on the editing screen and calculating an output of each unit, and debug view display control means for displaying the output of each unit obtained by being calculated by the program execution means in a debug view region associated with an icon of each of the units arranged on the editing screen.

6 Claims, 9 Drawing Sheets

(58) Field of Classification Search
USPC .................................................. 717/104–178
See application file for complete search history.

(56) References Cited

U.S. PATENT DOCUMENTS

| | | | | |
|---|---|---|---|---|
| 7,386,833 | B2* | 6/2008 | Granny | G06F 30/331 |
| | | | | 717/109 |
| 11,409,428 | B2* | 8/2022 | Váradi | G06F 3/04842 |
| 2003/0034998 | A1* | 2/2003 | Kodosky | G06F 3/04817 |
| | | | | 715/736 |
| 2003/0103234 | A1 | 6/2003 | Takabayashi et al. | |
| 2006/0053407 | A1* | 3/2006 | Kodosky | H04L 67/025 |
| | | | | 717/109 |
| 2010/0083154 | A1* | 4/2010 | Takeshita | G16H 30/20 |
| | | | | 715/781 |
| 2013/0229436 | A1 | 9/2013 | Freyhult et al. | |
| 2013/0311974 | A1* | 11/2013 | Albrecht | G06F 11/3636 |
| | | | | 717/125 |
| 2019/0220255 | A1 | 7/2019 | Taniguchi | |

FOREIGN PATENT DOCUMENTS

| | | |
|---|---|---|
| JP | 2006-079170 | 3/2006 |
| JP | 2008-204237 | 9/2008 |
| JP | 2011-118467 | 6/2011 |
| JP | 2013-140572 | 7/2013 |
| JP | 2015-519625 | 7/2015 |
| WO | 2018/061605 | 4/2018 |

OTHER PUBLICATIONS

Lau-Kee, David, et al. "VPL: An Active, Declarative Visual Programming System." VL. 1991.pp.1-15 (Year: 1991).*

Satyanarayan, Arvind, and Jeffrey Heer. "Lyra: An interactive visualization design environment." Computer graphics forum. vol. 33. No. 3. 2014.pp.351-360 (Year: 2014).*

Rossano, Gregory F., et al. "Easy robot programming concepts: An industrial perspective." 2013 IEEE international conference on automation science and engineering (CASE). IEEE, 2013.pp. 1119-1126 (Year: 2013).*

Rekimoto, Jun, and Masanori Saitoh. "Augmented surfaces: a spatially continuous work space for hybrid computing environments." Proceedings of the SIGCHI conference on Human Factors in Computing Systems. 1999.pp.378-385 (Year: 1999).*

Wang, Yun, et al. "Infonice: Easy creation of information graphics." Proceedings of the 2018 CHI Conference on Human Factors in Computing Systems. 2018.pp.1-12 (Year: 2018).*

Yasuda, K., "How to raise my artificial intelligence, non-official translation", Interface, Oct. 2018, vol. 44, No. 12, pp. 20-37, particularly, p. 35, right column line 4 to p. 36, right column line 5.

Yamamoto, R., "The AI-equipped image inspection system for the production process, non-official translation", AI Inspector (Eizojoho Industrial, Dec. 1, 2018, vol. 50, No. 12, pp. 99-106, entire text.

International Search Report issued in International Patent Application No. PCT/JP2019/045768, dated Jan. 7, 2020.

International Preliminary Report on Patentability issued in International Patent Application No. PCT/JP2019/045768, dated Jan. 7, 2020.

Office Action dated Feb. 2, 2021 issued in Japanese patent application No. 2020-553674 along with corresponding English translation.

Chinese Office Action dated Apr. 28, 2023 issued in Chinese patent application No. 201980077515.2 with corresponding English translation.

* cited by examiner (a)

(b)

PROGRAMMING DEVICES AND PROGRAMS FOR CREATING AND EDITING PROGRAMS USED FOR IMAGE PROCESSING

CROSS-REFERENCE TO RELATED APPLICATIONS

This application is a U.S. National Stage Application of International Application PCT/JP2019/045768, filed Nov. 22, 2019, which in turn claims the benefit of Japanese Application No. 2018-222247, filed on Nov. 28, 2018. The disclosures of these documents, including the specifications, drawings and claims, are incorporated herein by reference in their entirety.

FIELD OF THE INVENTION

The present invention relates to programming devices and programs suitable for creating and editing programs used for image processing and the like.

BACKGROUND ART

In recent years, photographing devices such as cameras for capturing images, computers for processing images, and the like, have become readily available, and systems incorporating image processing and/or image analysis are therefore utilized at various sites. Even at production sites in factories, image inspection systems using cameras and computers have become popular for dimensional inspection, appearance inspection, foreign matter inspection, and the like, of produced goods. As a solution for realizing such systems, image inspection systems, which are generalized on the assumption that they will be used at various sites, and software programs, which are sold as packages, are provided. However, in many cases, since it is difficult to cope with detailed specifications required at the sites if generalized systems and/or software programs are used as is, customization corresponding to special specifications or independent development of programs adapted for desired specifications are carried out. The detailed specifications are a combination of various specifications, for example, selection and change of an image processing algorithm according to a target object of image inspection, adjustment of a threshold value (parameter) essential for image processing, and the like.

Because of the wide variety of demands at the sites, there is a need for a programming environment in which programs can be developed and parameters can be adjusted so that a developer of the system and a user who operates the equipment at the sites can easily set and change image processing algorithms and threshold values by themselves.

Graphical programming languages, such as function block diagrams (FBD), are methods that allow programming even by users, and the like, who do not have a high level of expertise in programming.

In an FBD, programming can be performed graphically by using various components such as function blocks composed of functions corresponding to various types of arithmetic processing, connectors for exchanging input/output parameters with external devices, and connection lines for connecting these function blocks and connectors.

In a programming device for programming an FBD, editing work is performed in which symbols representing such components are arranged on an editing screen as objects, processing procedures are defined by connecting ports provided on these objects with connection lines, and processing in respective objects is adjusted by changing properties representing variables that can be set for the objects (see, for example, Patent Document 1).

PRIOR ART DOCUMENTS

Patent Documents

Patent Document 1: Japanese Unexamined Patent Application Publication No. 2008-204237

SUMMARY OF THE INVENTION

Problems to be Solved by the Invention

The programming work itself became easy in the conventional methods; however, when a program is to be validated, it is not possible to easily check the program resulting from intermediate processing in multi-stage processing configuring the program, and it takes a large amount of effort to perform debugging work and fine adjustment of the variables. In particular, in a program where various types of image processing are performed in multiple stages, since a variable change in one processing (object) can have a large influence on an output (including a final output, as a matter of course) in a subsequent stage, the trial-and-error process needs to be performed many times for the variable adjustment, resulting in a problem to the effect that iteratively editing and validating the program is a great burden.

The present invention is for solving such problem, and an object of the present invention is to provide a programming device capable of creating a program, typified by an image processing algorithm, and of easily validating a program being edited, and a program.

Means for Solving the Problem

In order to solve the above-mentioned problem, the programming device according to the present invention is a programming device for editing a program by arranging icons of units, the unit representing a processing unit, and linking the units on an editing screen in response to a user operation. The programming device is characterized in that it includes: program execution means configured to execute a program defined by the units arranged and linked on the editing screen and to calculate an output of each unit; and debug view display control means configured to display an output of each unit obtained by being calculated by the program execution means in a debug view region associated with an icon of each of the units arranged on the editing screen. The units configuring the program may be selectable from a plurality of options including an input to the programming device, an output from the programming device, conditional branching, and inference based on learned data from deep learning.

The programming device according to the present invention may further include unit editing means configured to accept a change in a setting value of each unit configuring the program.

In the present invention, the debug view display control means may update the display in the debug view region in real time in response to a change in the output of each unit while the program execution means executes the program. In addition, the debug view display control means may display, in the debug view region, a heat map that indicates a portion viewed as a feature by inference for a unit that performs inference based on the learned data from deep learning.

In the present invention, the unit editing means may be capable of accepting a change in a setting value of a unit while the program execution means is executing the program. In addition, the program execution means may reflect, as needed, the change in the setting value accepted by the unit editing means during the execution of the program to the calculation in the program being executed.

The programming device according to the present invention may be capable of utilizing a flexible image filter unit capable of selecting a plurality of types of image filters as a unit. The unit editing means may accept a setting of the flexible image filter unit by a user through a setting screen including: a first preview region configured to display a list of preview images obtained if each of a plurality of selectable types of image filters is applied to input data in such a manner that a preview image to which a selected image filter is applied is observable; a second preview region configured to display a list of preview images obtained if a plurality of settable setting values is applied regarding a characteristic parameter related to an image filter selected from the image filters in such a manner that a preview image to which a set setting value is applied is observable; and a target image display region configured to display a target image, which is a preview image obtained if a selected image filter is applied to input data with a set setting value of a characteristic parameter, the target image being displayed larger than the respective preview images displayed in the first preview region and the second preview region.

The program according to the present invention is characterized in that it causes a computer to function as any of the above-mentioned programming devices.

EMBODIMENTS OF THE INVENTION

Figure 1:
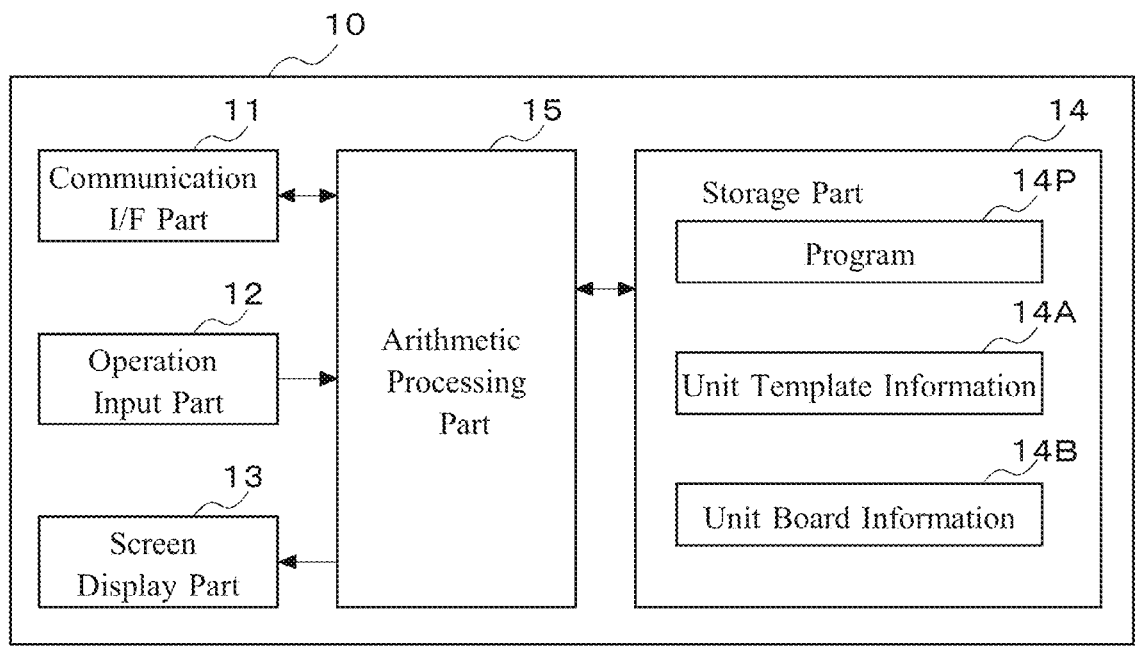
FIG. 1 is a block diagram showing a configuration of a programming device.

Embodiments of the present invention will now be described with reference to the drawings. FIG. 1 is a block diagram showing a configuration of a programming device according to the present embodiment.

The programming device 10 is, as a whole, composed of an information processing device such as a server device, a personal computer, and a personal digital assistant, and has a function of creating and editing programming by arranging various units, which are processing steps for configuring a program, on an editing screen and connecting these units with connection lines in accordance with user operations.

The units that can be arranged in the programming device 10 include not only image processing but also various other elements necessary for image inspection (e.g., input, output, conditional branching, inference based on learned data from deep learning, etc.), and all processing can be treated as a unit in a unified manner in programming. Input units include cameras, external programs, shared memory, network input via TCP/IP, image files, CSV files, I/O boards, and the like. As a camera unit, not only a standard USB camera (UVC driver) but also a unit corresponding to the main industrial camera of each company will be available. Output units include indication on displays, image files, CSV files, shared memory, network communications via TCP/IP, I/O boards, pilot lamps, and the like. Image processing units include image processing of various filters and the like, calculation with respect to a plurality of inputs (addition/subtraction of images, etc.), image separation by RGB, output of HSV (H: hue, S: saturation, V: value) information from an image, and the like. Other units include processing that involves determination such as conditional branching and inference based on learned data from deep learning. Unit template information 14A is prepared in advance for these units, in which processing content and the like are defined as will be described hereinafter. The user of the programming device 10 freely arranges and links these units to create a desired program.

As shown in FIG. 1, the programming device 10 is provided with a communication I/F part 11, an operation input part 12, a screen display part 13, a storage part 14, and an arithmetic processing part 15 as main functional parts.

The communication I/F part 11 is composed of an interface circuit for communication, and has a function of exchanging various types of data by performing data communication with an external device (not shown) via a communication line. Examples of the external device include: equipment that provides input information to the programming device, such as a camera or various sensors; output equipment controlled by a program, such as a pilot lamp or a buzzer; and an information processing device that receives the execution result of a program to perform further processing, such as a server device, a personal computer, or a personal digital assistant.

The operation input part 12 is composed of an operation input device such as a keyboard, a mouse, or a touch panel, and has a function of detecting an operation indicating a user operation and outputting the operation to the arithmetic processing part 15.

The screen display part 13 is composed of a screen display device such as an LCD, and has a function of displaying various types of data such an editing screen or a setting screen output from the arithmetic processing part 15.

The storage part 14 is composed of a storage device such as a hard disk or a semiconductor memory, and has a function of storing various types of processing information and a program 14P used for the processing in the arithmetic processing part 15.

The program 14P is a program for realizing various processing parts by being executed by a CPU in the arithmetic processing part 15, and is read out from an external device or a recording medium (both not shown) and stored in advance in the storage part 14.

The main processing information stored in the storage part 14 includes unit template information 14A and unit board information 14B. The unit template information 14A is information that defines a data structure, a variable, an algorithm, and the like, for each of the various units, which are processing steps configuring a program.

Figure 2:
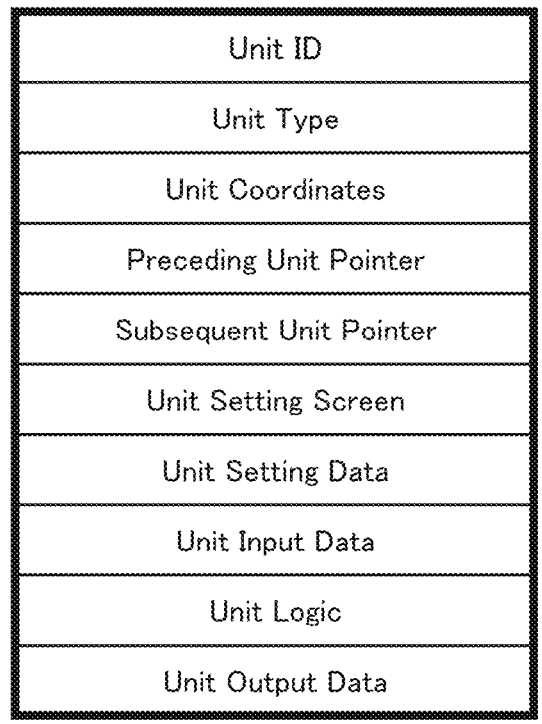
FIG. 2 is a diagram showing an example of a data structure of a unit.

FIG. 2 shows an example of the data structure of a unit. The unit ID is unique identification information for identifying the unit, and is automatically assigned when the unit is arranged in the course of programming. The user may be prohibited from editing the unit ID. The unit name is the name of the unit displayed on the editing screen and can be freely assigned by the user. The unit type is information indicating the type of the unit, and this unit type is predefined and editing by the user is prohibited. Types of units include input units (camera, input image file, etc.), output units (pilot lamp, indication on a display, output file, etc.), image processing units (filter, image size conversion, etc.), and the like. The programming device 10 of the present embodiment is provided with a flexible image filter unit, which will be described hereinafter, as one of the units for performing filtering processing on an image.

The unit coordinates are information indicating the display position of a unit in the editing screen. The initial values of the unit coordinates are determined when the unit is placed in the course of programming, and the unit coordinates are then updated accordingly as the user moves the unit in the editing screen.

The preceding unit pointer and the subsequent unit pointer are information that defines the connection relationship of units. The preceding unit pointer stores a pointer (memory address) to the data of a unit linked to the relevant unit in the preceding stage. The subsequent unit pointer stores a pointer (memory address) to the data of a unit linked to the relevant unit in the subsequent stage. The preceding unit pointer and the subsequent unit pointer are set through the operation of linking a plurality of units arranged in the course of programming.

The unit setting screen is information that defines a unit-specific setting screen displayed when a unit is arranged in the course of programming, and the unit setting screen is predefined and editing by the user is prohibited. For example, in the case of a camera input unit, a screen for setting the camera number (indicating the camera model, etc.) is defined. It should be noted that a screen for setting a common setting item regardless of the unit type, such as a unit display name, may not need to be defined here.

The unit setting data is information of unit-specific setting data. For example, in the case of a camera input unit, the camera number indicating the selected camera corresponds to the unit setting data. In the case of a resizing unit that converts the size of input image data, information defining the size of the re-sized image (e.g., the number of pixels, the enlargement ratio with respect to the input image), corresponds to the unit setting data.

The unit input data represents data, such as an image or a file, input to the relevant unit from a unit in the preceding stage. The input data may not need to be defined for a unit to which no other unit is connected in the preceding stage, as in the camera input unit.

The unit logic defines the algorithm of the processing executed by the relevant unit, and the unit logic is predefined and editing by the user is prohibited. The user is allowed to adjust the processing in the unit to the extent possible by changing the setting data. As to the unit logic, for example, for a unit that obtains an input from external equipment, as in the camera input unit, an algorithm is defined for obtaining necessary data and outputting the same to the subsequent stage by controlling the external equipment. Further, for a unit that controls external equipment based on input data, as in the pilot lamp unit, an algorithm is defined for causing the external equipment to perform a desired operation by controlling the external equipment. In addition, for a unit that processes input data and outputs output data, as in the filter unit, an algorithm is defined that outputs output data based on the input data.

The unit output data represents data, such as an image or a file, output from the relevant unit to a unit in the subsequent stage. The output data may not need to be defined for a unit to which no other unit is connected in the subsequent stage, as in the pilot lamp unit or the output file unit.

The storage part 14 stores, as the unit template information 14A, data structures as described above, and predefined information, such as unit types, setting screens, logics, and the like, for various units.

The unit board information 14B is information representing a program created by a user by combining various units. Information on a plurality of units that are arranged and linked using the editing screen (described hereinafter) is stored as the unit board information 14B in the format according to the above-described data structure of the unit.

The arithmetic processing part 15 includes a CPU and its peripheral circuits, and implements various types of processing of the programming device by reading and executing the program 14P in the storage part 14. In other words, the arithmetic processing part 15 functions as program execution means, debug view display control means, and unit editing means in the present invention. The main processing implemented by the arithmetic processing part 15 includes editing processing of a unit board.

The editing processing includes a function of arranging various units on the editing screen according to user operations, a function of linking the arranged units according to user operations, a function of changing the setting values of the arranged units according to user operations, and the like.

Figure 3:
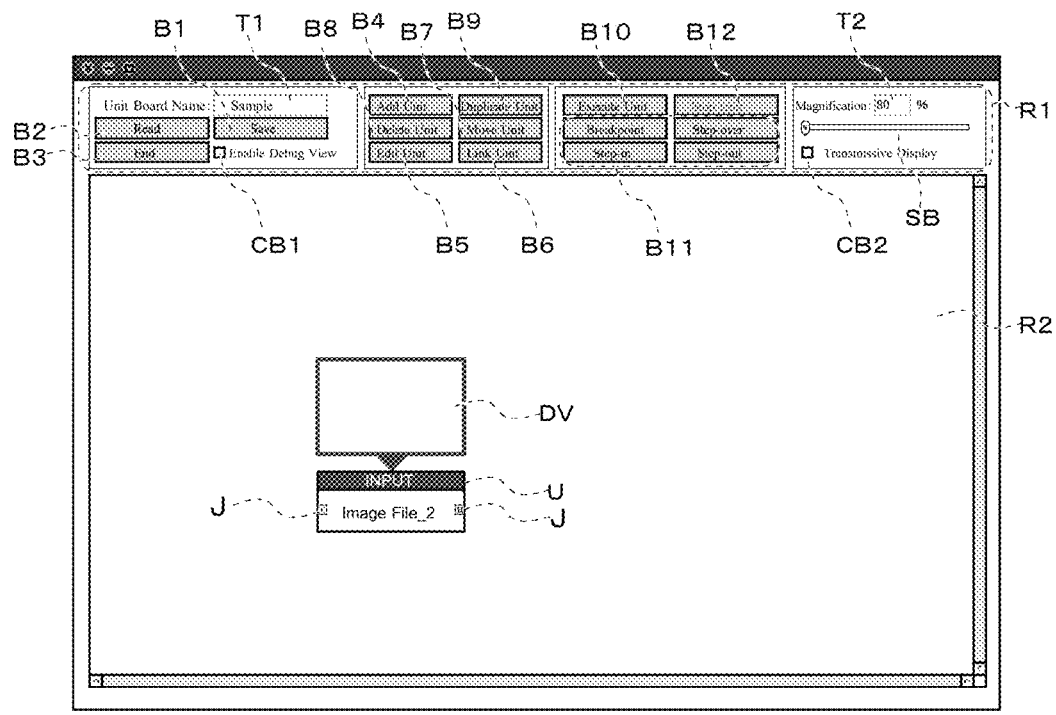
FIG. 3 is a diagram showing an example of an editing screen.

FIG. 3 shows an example of an editing screen used when the editing processing is performed. As shown in FIG. 3, the editing screen includes a control region R1 in which control buttons used for editing and controlling the unit(s) are arranged, and a unit board editing region R2 which is a region for performing graphical programming by the user arranging and connecting the unit(s).

The control region R1 is provided at the upper part of the editing screen, and a plurality of control objects, such as control buttons and check boxes for arranging, moving, executing, and the like, the units are arranged. These control objects are roughly classified into four types: those related to control of the unit board information 14B; those related to programming in the unit board editing region R2; those related to execution control of a program programmed in the unit board editing region R2; and those related to indication control of the unit board editing region R2.

The control objects related to the control of the unit board information 14B include name indication T1 of the unit board being edited, a save button B1 for saving a unit board (program) programmed in the unit board editing region R2, a read button B2 for reading the saved unit board and displaying it in the unit board editing region R2, an end button B3 for ending the editing of the unit board being edited in the unit board editing region R2, a checkbox CB1 for selecting whether or not to enable a debug view (described hereinafter), and the like.

The control objects related to the programming in the unit board editing region R2 include a unit addition button B4, a unit edit button B5, a unit link button B6, a unit movement button B7, a unit deletion button B8, and a unit duplication button B9.

The unit addition button B4 is a control button for starting an addition mode for arranging a new unit in the unit board editing region R2. If the unit addition button B4 is pressed, a unit selection screen is displayed for selecting a unit to be arranged. After a desired unit is selected on the unit selection screen and the unit is set according to the screen indication, if a desired position in the unit board editing region R2 is clicked, an icon of the unit is arranged at the clicked position. As shown in FIG. 3, the icon of the unit is a substantially rectangular object, and the unit type and the unit name are indicated.

The unit edit button B5 is a control button for starting an editing mode for editing the settings of the unit(s) arranged in the unit board editing region R2. If this unit edit button B5 is pressed and the icon of a unit arranged in the unit board editing region R2 is clicked, a setting screen for editing the setting value of such unit is displayed. The user can edit various setting values of the unit on the setting screen.

The unit link button B6 is a control button for starting a linking mode for setting a connection relationship between units arranged in the unit board editing region R2. Here, the linking of units refers to defining of the data passing so that an output of a linking-origin unit becomes an input for a linking-destination unit.

Figure 4:
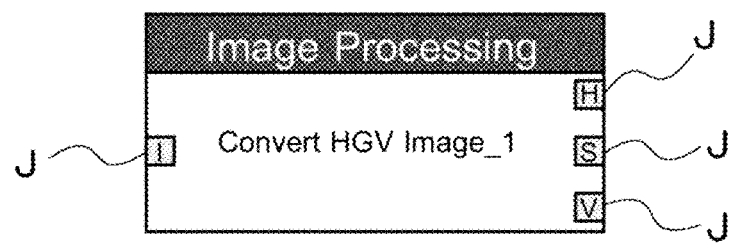
FIG. 4 is a diagram showing an example of an icon of a unit having a plurality of output data pieces.

FIG. 4 shows a display example of a unit that outputs HSV (H: hue, S: saturation, V: value) information from an image as an example of the unit. As illustrated in FIG. 4, each unit is displayed with a joint graphic J (e.g., a small square), the number of which corresponds to the number of inputs and outputs. A character, or the like, indicating the content of an input and/or an output is displayed on the joint graphic J. The left side of the icon of the unit represents the input end and the right side represents the output end. Therefore, the joint graphic(s) J, the number of which correspond(s) to the number of inputs, is(are) displayed on the left side of the unit, and the joint graphic(s) J, the number of which correspond(s) to the number of outputs, is(are) displayed on the right side of the unit. In order to visualize the linking relationship, a connection line (a line that connects the joint graphics J to each other) is displayed in the unit board editing region R2 for indicating that the units are linked.

If the unit link button B6 is pressed, the linking mode is started to enter into a state in which selection of a unit to be specified as a linking origin is accepted. If an icon of a desired unit (for a unit having a plurality of outputs, any of the joint graphics J representing the outputs) is clicked, an output of such unit (if there are a plurality of outputs, the one corresponding to the joint graphic J that is clicked) is specified as a linking origin. Next, if an icon of a unit to be specified as a linking destination (for a unit having a plurality of inputs, any of the joint graphics J representing the inputs) is clicked, an input of such unit (if there are a plurality of inputs, the one corresponding to the joint graphic J that is clicked) is specified as a linking destination, and the two units are linked. A pair of units can be linked through such operation. A line connecting the joint graphics J of the linked units is displayed in the unit board editing region R2 for indicating the link. The left side of the icon of the unit represents the input end and the right side represents the output end. Therefore, if an output of a first unit is to be input to a second unit, a line connecting the right side of the icon of the first unit and the left side of the icon of the second unit is displayed.

The unit movement button B7 is a control button for starting a movement mode for setting a connection relationship between the units arranged in the unit board editing region R2. In the movement mode, which is entered after pressing the unit movement button B7, the user can freely move the unit(s) arranged in the unit board editing region R2 by way of a drag-and-drop operation.

The unit deletion button B8 is a control button for starting a deletion mode for deleting a unit arranged in the unit board editing region R2. In the deletion mode, which is entered after pressing the unit deletion button B8, if a unit arranged in the unit board editing region R2 is clicked, such unit can be deleted. It should be noted that a screen for requesting confirmation of the intention may be displayed before executing the deletion, and the deletion can only be executed if the intention of deletion is confirmed.

The unit duplication button B9 is a control button for starting a duplication mode for duplicating a unit arranged in the unit board editing region R2. In the duplication mode, which is entered after pressing the unit duplication button B9, if a unit arranged in the unit board editing region R2 is clicked, such unit is selected as a duplication target. Further, if a position within the unit board editing region R2 is clicked, a duplicate (with a different unit ID and unlinked) of the selected unit is added at the clicked position.

The control objects related to the execution control of a program programmed in the unit board editing region R2 include a unit execution button B10, a stepwise execution button B11, and a unit stop button B12.

The unit execution button B10 is a control button for starting an execution mode for executing a program defined in the unit board editing region R2. In the execution mode, which is entered after pressing the unit execution button B10, a series of programs defined by a group of units arranged and linked in the unit board editing region R2 is executed from the beginning to the end by the arithmetic processing part 15.

The group of stepwise execution buttons B11 is a group of control buttons for controlling a stepwise execution mode in which the programs defined in the unit board editing region R2 are sequentially executed in steps. The group of stepwise execution buttons B11 is mainly used for debugging, such as an operation check of a program, and includes buttons for performing control such as breakpoint setting, step-in, step-over, and step-out.

The unit stop button B12 is a control button for ending the unit execution mode and the stepwise execution mode.

The control objects related to the indication control of the unit board editing region R2 include a text box T2 and a slider bar SB for setting a display magnification in the unit board editing region R2, and a check box CB2 for setting whether or not to display the unit(s) in the unit board editing region R2 in a transmissive manner.

The unit board editing region R2 is a region in which icons of units, connection lines between units, and the like, are displayed. The user can freely move the unit(s) arranged in the unit board editing region R2 by way of a drag-anddrop operation, and can adjust the setting value by causing a setting screen to be displayed by double-clicking the unit.

Further, a debug view DV can be displayed on the unit board editing region R2 for indicating the processing result (output data) of the arranged individual unit. The debug view DV may be displayed, for example, as a balloon from a corresponding unit. Whether or not to display the debug view DV is determined by the input state (ON/OFF) of the checkbox CB1 provided in the unit board editing region R2. If the checkbox CB1 is ON, the debug view DV is displayed when the unit(s) in the unit board editing region R2 is(are) edited not only in the unit execution mode and the stepwise execution mode, but also in other modes, such as the addition mode and the editing mode. For a unit whose output is established even if the execution mode is not entered, as in a unit that outputs a predetermined still image, such unit's output is displayed in the debug view DV only by arranging such unit. On the other hand, for a unit whose output data is not output unless processing is executed, as in a camera unit or an image processing unit, merely arranging such unit will only display the frame of the debug view DV, in which no output data (image) is shown and thus the debug view DV is blank. The output data is displayed only after the execution. During execution, the display of the debug view DV is updated in real time as a function of changes in the output of the unit.

The output data of the unit to be displayed in the debug view DV may vary depending on the unit type. In the case of a unit that outputs an image, as in a camera unit or an image processing unit, the image may be displayed in the debug view DV as the output data. In addition, in the case of an inference unit based on learned data from deep learning, the output data may be classified into classes by inference based on the input to the unit, and the ranking (the numerical numbers indicating the order of the classes in descending order of likelihood of being relevant) and the estimated probability (likelihood of being relevant) of each class may be displayed in the debug view DV. Alternatively, in an inference unit based on learned data from deep learning, a heat map that indicates a portion viewed as a feature by a neural network may be displayed in the debug view DV. The heat map may be superimposed on an input image and displayed in a semi-transmissive manner.

By displaying such a debug view DV for each unit arranged in the unit board editing region R2, it is possible to check, at a glance, not only the final output but also the intermediate output data in each unit. In a program that performs various types of image processing in multiple stages, since the transition of the processing result through the processing (i.e., unit) of each stage can be confirmed up to the final output in an overall picture, a trial-and-error process for settings can be easily performed in order to obtain a desired output result while viewing the debug views DV.

The unit edit button B5 is enabled during the execution mode. If the unit edit button B5 is clicked during the execution mode and the icon of a unit to be edited is clicked, the setting screen of such unit is displayed. If a setting value is changed on the setting screen, such change in the setting value is reflected in the program being executed in real time. As a result, the display of the debug view DV also immediately reflects the effect of such change in the setting value. With such configuration, the user can adjust a setting value while checking the effect of changing the setting value.

Next, a flexible image filter unit will be described, which can be utilized in the programming device 10 of the present embodiment as one of the units arranged in the unit board editing region R2 by using the operation screens described above. Various types of algorithms have conventionally been used as filters for images, such as Hough transformation, binarization, inversion, edge extraction, color extraction, and saturation extraction. The flexible image filter unit is a unit that takes in, as setting values, a type (algorithm) of the filter and a characteristic parameter, which determines the characteristic of the filter. Since the flexible image filter unit is a unit that applies filtering on an image, both input data and output data are image data.

Figure 5:
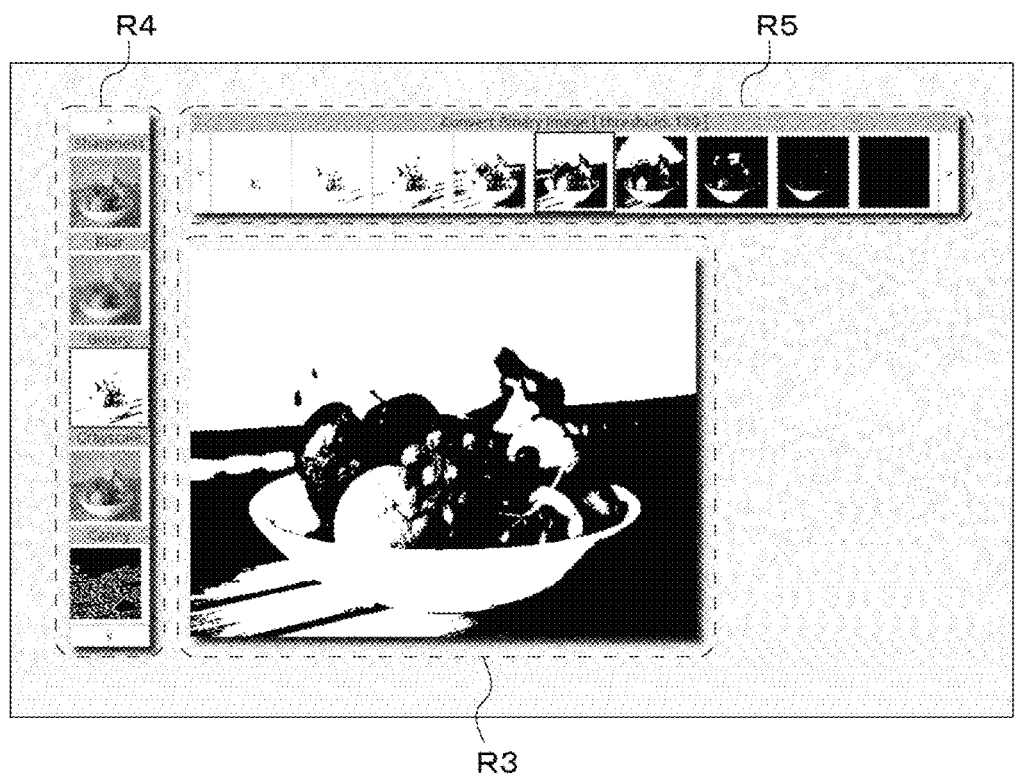
FIG. 5 shows an example of a setting screen of a flexible image filter unit.

As with the other units, the flexible image filter unit is rendered available by being added to and linked in the unit board editing region R2; however, it has a feature in its setting screen. FIG. 5 shows an example of a setting screen that accepts settings of the flexible image filter unit. As shown in FIG. 5, the setting screen of the flexible image filter unit includes a target image display region R3, an algorithm preview region R4 (corresponding to a first preview region of the present invention), and a parameter preview region R5 (corresponding to a second preview region of the present invention). The target image display region R3 occupies the main region in the screen including the center portion of the screen. A target image, which is a preview image obtained if a filter of the filter type and the characteristic parameter currently set is applied to the input data, is displayed in the target image display region R3. The target image displayed in the target image display region R3 may be displayed larger than preview images displayed in the algorithm preview region R4 or the parameter preview region R5. The preview images displayed in the respective regions (R3 to R5) may be configured so as to be selected by browsing the preview images obtained by applying, in advance, the filters of the respective conditions to the input, or may be configured so as to be sequentially processed and updated every time a selection is made.

The algorithm preview region R4 is a region provided on the left side of the target image display region R3. Preview images, which are obtained if filters of the selectable algorithms (the characteristic parameters thereof may be set to predetermined initial values of the respective filters) are applied to the input data, are displayed vertically side by side in the algorithm preview region R4. Among the plurality of preview images, the preview image corresponding to the filter type currently selected is made observable by, for example, surrounding such preview image with a thick frame. In the example of FIG. 5, a binarization filter is selected.

In the setting screen of the flexible image filter unit, the operation of selecting the filter type may correspond to the display in the algorithm preview region R4. Specifically, the filter type may be selected by the operation of pressing the "up" or "down" key on a keyboard, the operation of rotating the scroll wheel on a mouse, the operation of clicking, with a mouse, on the preview image corresponding to the desired filter in the algorithm preview region R4, and the like. In addition to these intuitive operations, the selection of a filter type may be accepted from a list box or the like.

The parameter preview region R5 is a region provided above the target image display region R3. A plurality of preview images, which are obtained using different characteristic parameters for the filter algorithm currently selected, are displayed horizontally side by side in the parameter preview region R5. Among the plurality of preview images, the preview image corresponding to the characteristic parameter currently set is made observable by, for example, surrounding such preview image with a thick frame. The preview images may be generated with the values of the characteristic parameters, which are divided into a predetermined number of steps between the settable minimum value and the settable maximum value, and may be displayed in the ascending order or the descending order of the values of the characteristic parameter. The example of FIG. 5 shows the display of preview images which are obtained using different threshold values of binarization in the case where the binarization filter is selected.

In the setting screen of the flexible image filter unit, the operation of setting the characteristic parameter may correspond to the display in the parameter preview region R5. Specifically, the characteristic parameter may be set by the operation of pressing the "right" or "left" key on a keyboard, the operation of clicking, with a mouse, on the preview image corresponding to the desired characteristic parameter in the parameter preview region R5, the operation of switching the mouse wheel to the left and right, the operation of clicking on the right/left button on a mouse while pressing a particular key (such as the Shift key or Ctrl key), and the like. In addition to these intuitive operations, an input area may be provided for inputting a value of the characteristic parameter such that a direct input may be accepted.

No specific image processing algorithm is determined in the flexible image filter unit when a unit is added. Appropriate filter conditions can be quickly set, along with saving time spent on the trial-and-error process, by performing the selection of the algorithm and the setting of the threshold value of each algorithm in a two-dimensional manner with an overhead view, while the unit board (program) including the flexible image filter unit is executed experimentally.

With the above-described flexible image filter unit, the image processing algorithms can be switched while checking the processing results of the respective algorithms with the vertical list displayed in the algorithm preview region R4. Further, the parameter can be changed while checking the effects of the parameter changes with the horizontal list displayed in the parameter preview region R5 in an overhead view with respect to the processing result for each threshold value of the selected algorithm. As a result, the trial-and-error process of the filter selection and characteristic parameter setting, which required time in the conventional methods as setting and checking needed to be performed for every single filter selection and character setting, can be performed efficiently with intuitive operations in the setting screen while checking the effect of the setting change.

Operation of the Embodiment

Next, a typical flow of programming using the programming device 10 configured as described above will be described.

Figure 6:
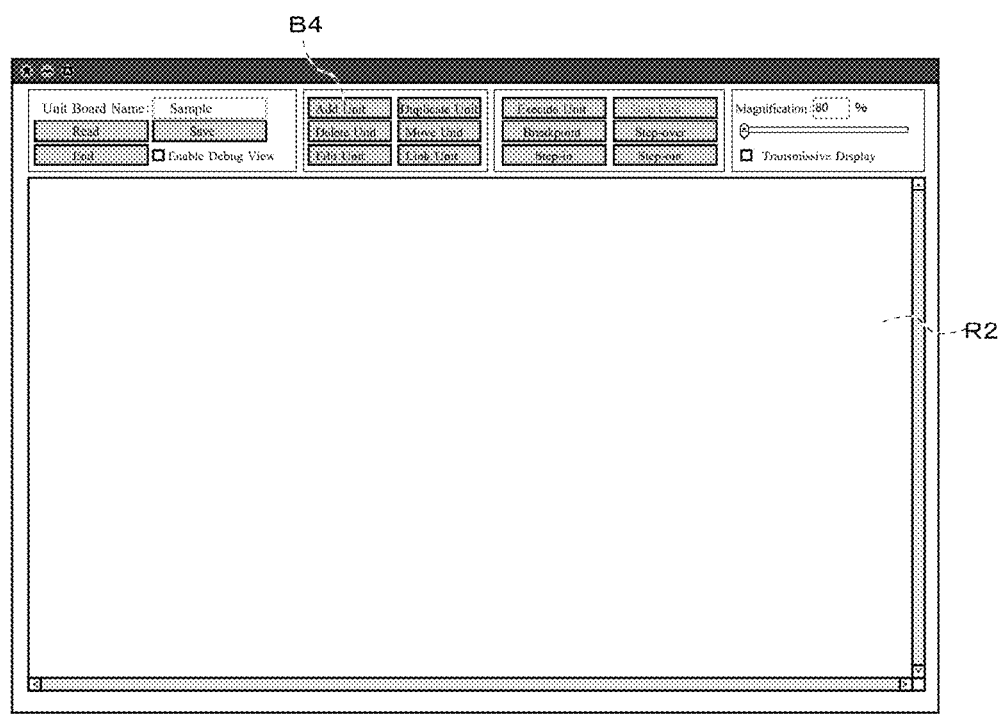
FIG. 6 is a diagram showing an example of an editing screen immediately after startup.

When the program 14P is activated in the programming device 10, an editing screen is displayed as shown in FIG. 6. In the editing screen immediately after the activation, the unit board editing region R2 is blank.

Figure 7:
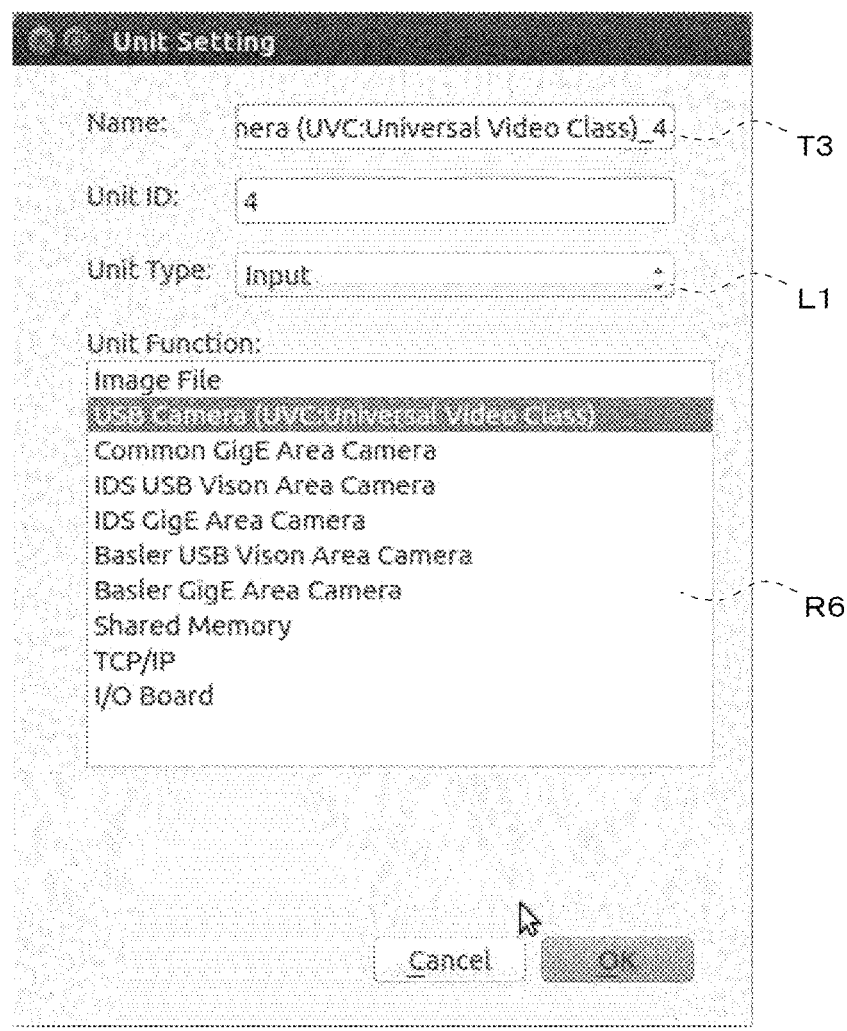
FIG. 7 is a diagram showing an example of a unit selection screen.

Next, when the unit addition button B4 is clicked to enter the addition mode, a unit selection screen is displayed as shown in FIG. 7. On this unit selection screen, any of the various units registered in the unit template information 14A is selected. Each unit is classified by unit type (the unit type in the data structure). Then, on the unit selection screen, a desired unit type is selected from the list menu L1, and any of the units belonging to the selected unit type, the units being displayed in the list in the unit display region R6, is selected to specify the unit to be added. Here, it is assumed that the USB camera unit belonging to the unit type "Input" is selected. Further, on the unit selection screen, the unit name is set by appropriately editing in the text box T3. Here, it is assumed that the name "USB Camera (UVC Universal Video Class) 4" is set as the unit name.

Figure 8:
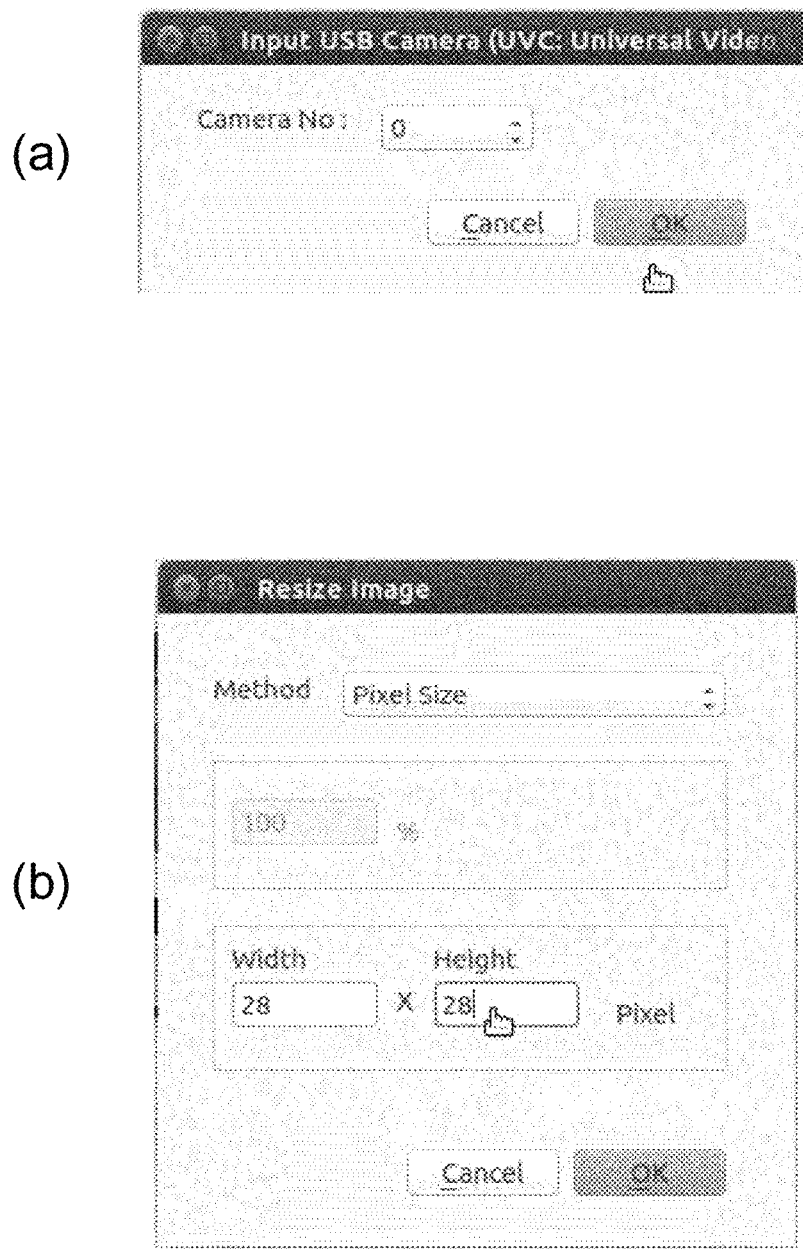
FIG. 8 is a diagram showing an example of a unit setting screen.
Figure 9:
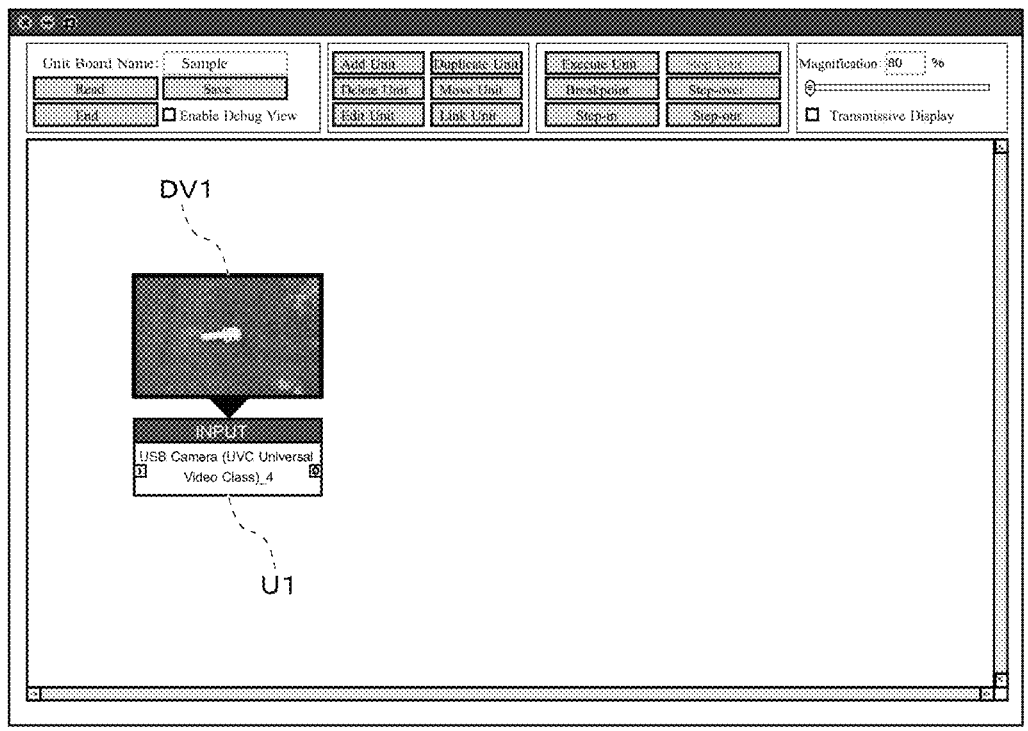
FIG. 9 is a diagram showing an example of an editing screen in a state where one unit is added.

When the OK button is clicked after the selection of the unit and the setting of the unit name are completed, the unit selection screen disappears and the unit setting screen is displayed. The unit setting screen is a unit-specific setting screen as described above in the data structure of the unit. Here, an example of the unit setting screen for the USB camera to be added is shown in FIG. 8(a). On this setting screen, the camera number is set. FIG. 8(b) is another example of the unit setting screen, and shows the unit setting screen for the resizing unit that changes the image size. When the OK button is clicked after the desired setting is performed on the unit setting screen(s) specific to the unit(s) to be added as described above, the indication of the unit setting screen(s) disappears and an input waiting state is entered. Then, when a position where the icon of the unit is to be arranged in the unit board editing region R2 is clicked, the icon U1 of the unit selected on the unit selection screen is added at the clicked position as shown in FIG. 9, and then the addition mode ends. A debug view DV1 is displayed next to the icon U1, depending on the setting in the checkbox CB2. The same operations are repeated to add the required number and types of units to the unit board editing region R2.

If the editing mode is entered by pressing the unit edit button B5, the unit setting screen can be started by clicking the icon of the added unit, and various parameters and other details of the unit can be changed. It is also possible to perform deletion of a unit using the unit deletion button B8, duplication of a unit using the unit duplication button B9, and the like.

The unit board (i.e., the program defined by the connection of the units) edited in the unit board editing region R2 can be saved by specifying the unit board name and the storage location on a screen displayed by clicking the save button B1. Further, the unit board created in the past may be selected on a screen displayed by clicking the read button B2, and such unit board may be read to be displayed in the unit board editing region R2.

Figure 10:
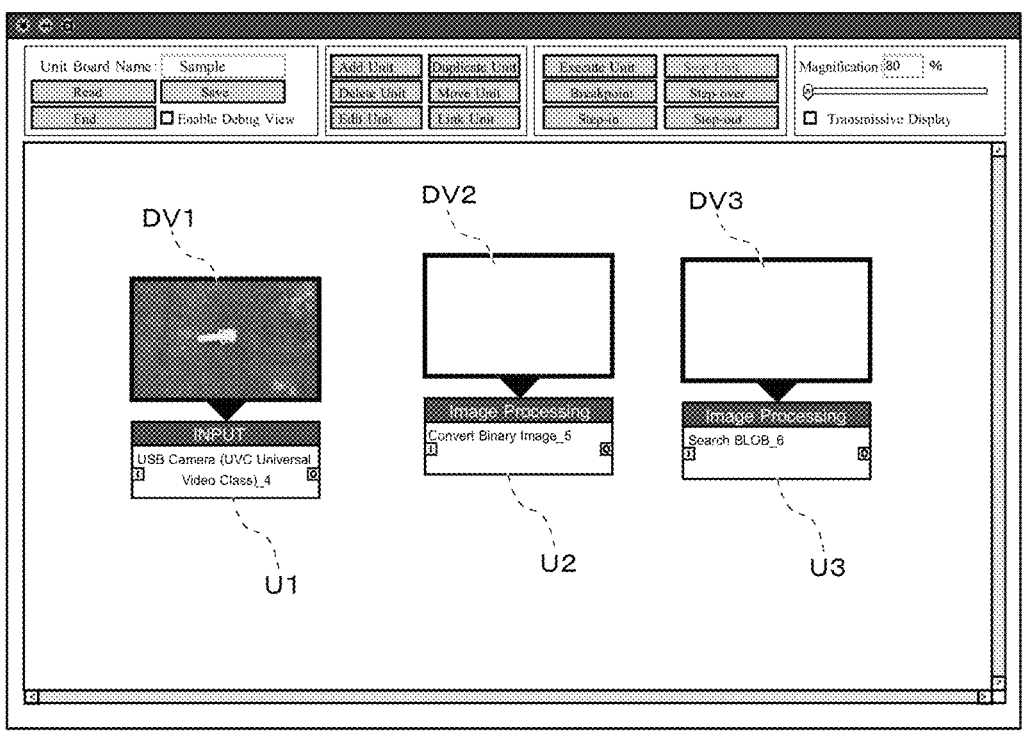
FIG. 10 is a diagram showing an example of an editing screen in a state where three units are added.

FIG. 10 shows an example of the screen in which three units (U1 to U3), representing a USB camera, binarization, and BLOB detection, are added. In the state shown in FIG. 10, the units are not linked, and passing of input/output data is not performed. The linking mode is then entered by clicking the unit link button B6, and the connection between the units is set. When the linking mode is started, first, a state is entered in which selection of a unit to be specified as a linking origin is accepted. If the joint graphic of an output of the desired unit is clicked, such unit is specified as the linking origin. Next, if the joint graphic of an input of the icon of the unit to be specified as the linking destination is clicked, the two units are linked, and then the linking mode ends. A pair of units can be linked through the series of operations described above.

Figure 11:
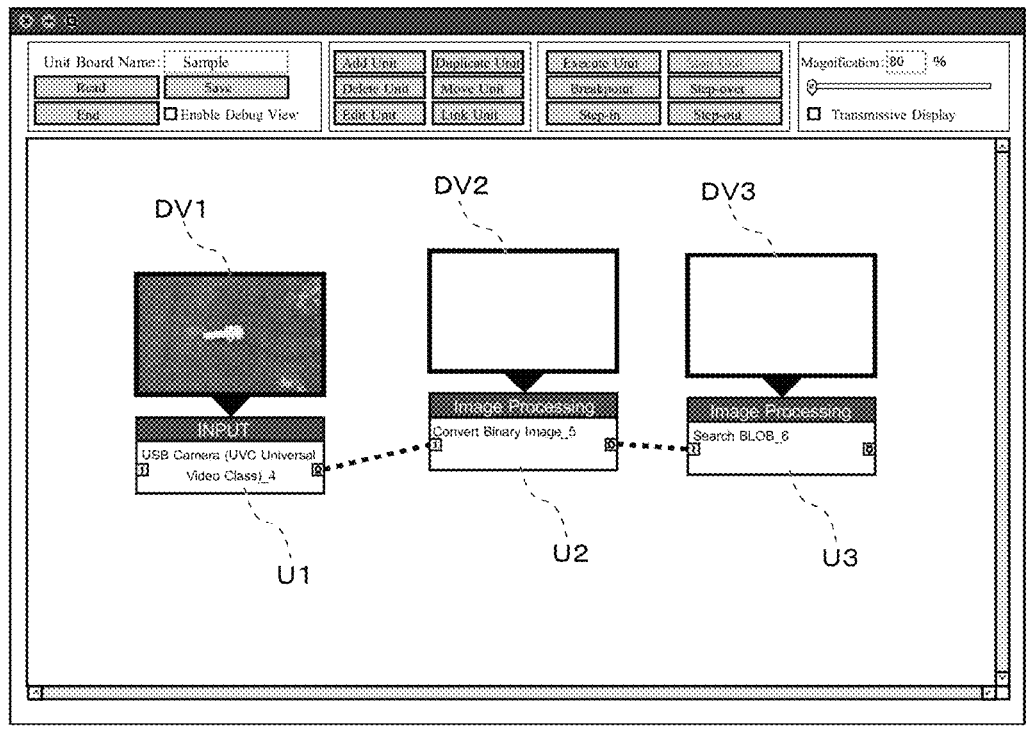
FIG. 11 is a diagram showing an example of an editing screen in a state where the three units are linked.
Figure 12:
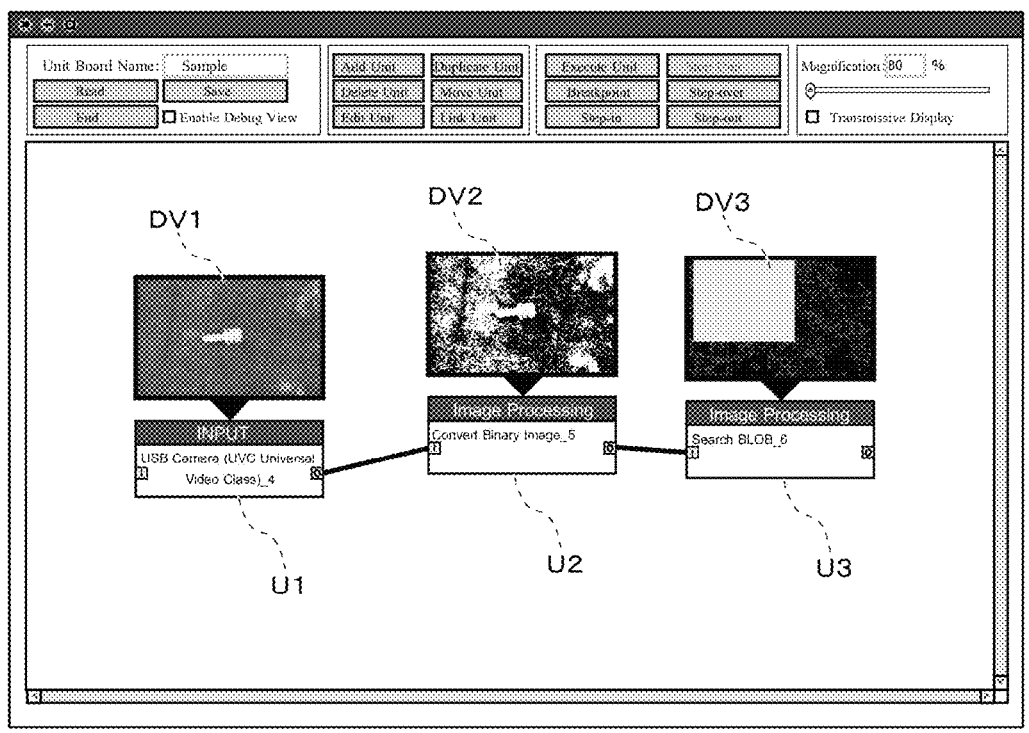
FIG. 12 is a diagram showing an example of an editing screen in the execution mode.

FIG. 11 shows that the three units (U1-U3) added in the unit board editing region R2 are connected in the order of the USB-camera, binarization, and BLOB detection. If the unit execution button B10 is clicked in this state, the execution mode is entered, and the program is then executed. Specifically, the capturing with the USB camera is started, and then the gray scale conversion and resizing are performed on the captured image. If the debug view DV is enabled in the execution mode, the output of each unit is displayed in real time in the debug view (DV1-DV3) corresponding to each unit (U1-U3), as shown in FIG. 12. The execution mode is continued until the unit stop button B12 is clicked.

Figure 13:
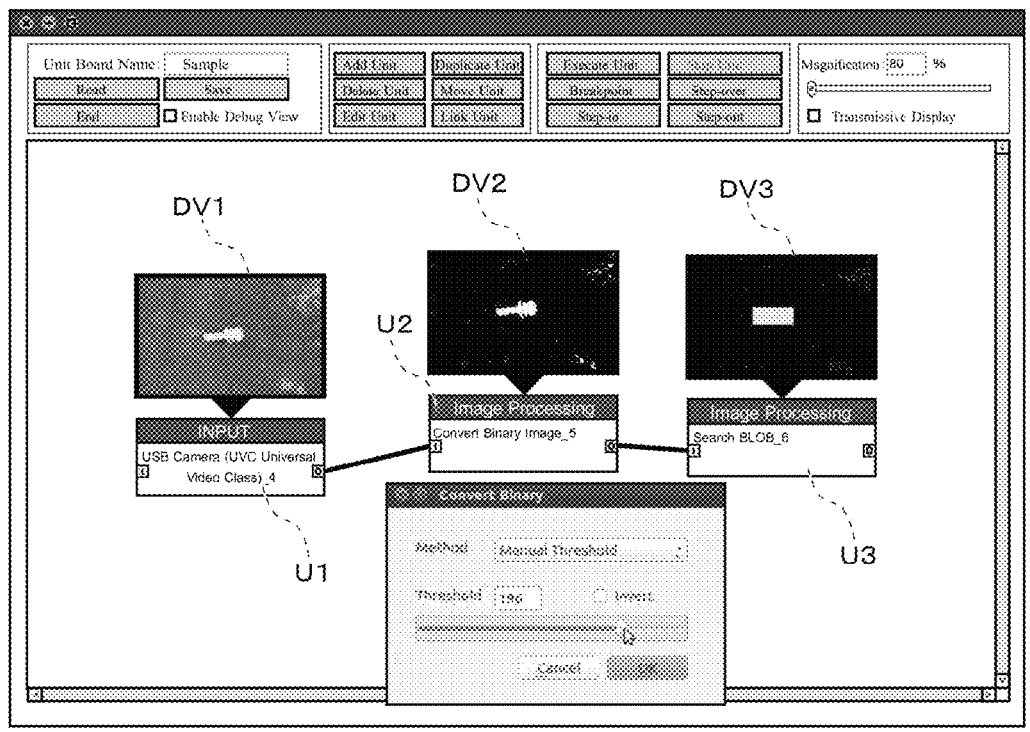
FIG. 13 is a diagram showing an example of an editing screen in the editing mode.

In the programming device 10, adjustment of the setting value of each unit is allowed while the execution mode continues. Specifically, the unit edit button B5 is enabled even during the execution mode, and if a unit whose setting value is desired to be adjusted is clicked, after clicking the unit edit button B5, the setting screen for such unit is displayed. If the setting value is changed on the displayed setting screen, such change is reflected in the debug view in real time. For example, in the example shown in FIG. 13, the setting value (the threshold value) is adjusted on the setting screen for the binarization unit while checking the images of the respective stages in real time in the debug views (DV1-DV3), so that the detection target emerges in the images as a white lump. With such configuration, the user can efficiently perform adjustment of the individual layers (i.e., units) in the image processing program, which is a compilation of stacks of various algorithms, while checking the effect thereof in real time.

Figure 14:
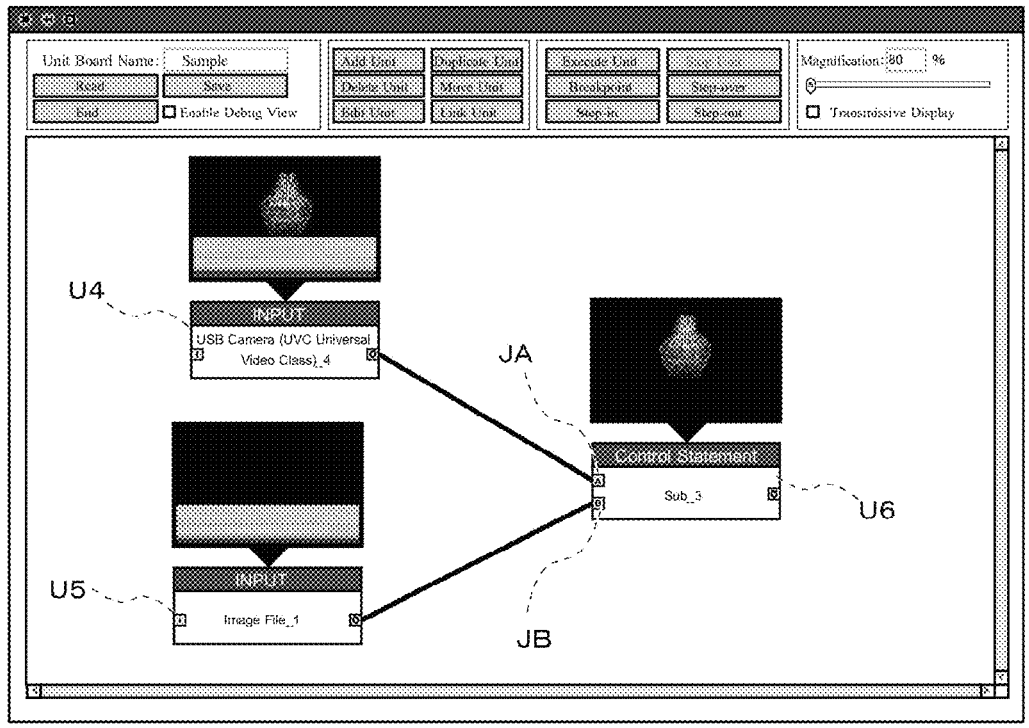
FIG. 14 is a diagram showing another example of a unit board.

FIG. 14 shows another example of the unit board programmed using the programming device 10. Specifically, FIG. 14 shows a unit board in which more complicated processing is implemented by using a unit with multiple inputs and a unit with multiple outputs.

More specifically, the unit board shown in FIG. 14 is provided with a USB camera unit U4 and a still image unit U5 as input units, and implements processing for extracting an image of a subject of interest without a background by subtracting a still image from the image captured with a USB camera by a subtraction unit U6. The subtraction unit has two inputs (input A and input B) and outputs an image obtained by subtracting an image input to the input B from an image input to the input A.

The method of adding the units to the unit board editing region R2 and linking the units is the same as that described with reference to FIG. 10. Which input of the subtraction unit the linking is made to when the units are linked is set depending on which of the joint graphics JA and JB is clicked.

As in the example shown in FIG. 14, if there are a plurality of units to which no other unit is connected in the preceding stage, the program is implemented such that the processing starts from these plurality of units. A unit to which no other unit is connected in the preceding stage may be automatically set as a unit serving as a starting point of such processing, or the user may explicitly set a unit serving as a starting point. If the user explicitly sets a unit serving as a starting point, an interface for setting the unit serving as a starting point may be provided to the editing screen, and information indicating that the unit is the starting point may be included in the unit data structure, in addition to the items shown in FIG. 2.

Figure 15:
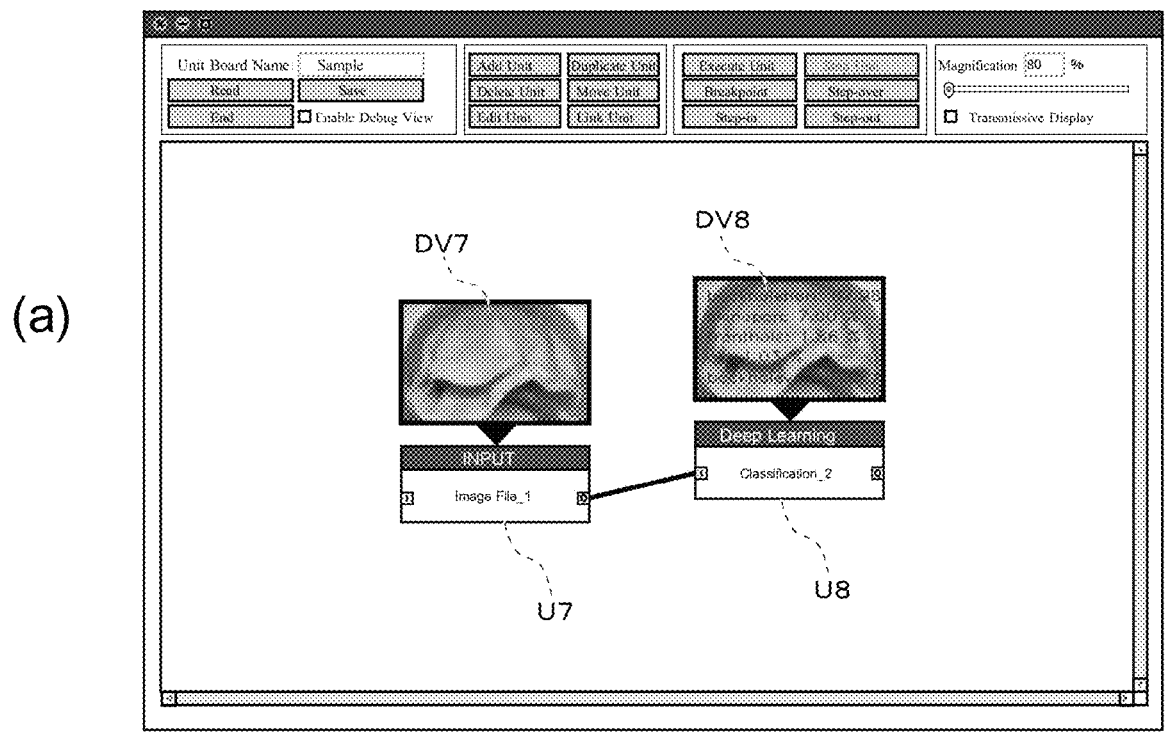
FIG. 15 is a diagram showing still another example of a unit board.
Figure 15:
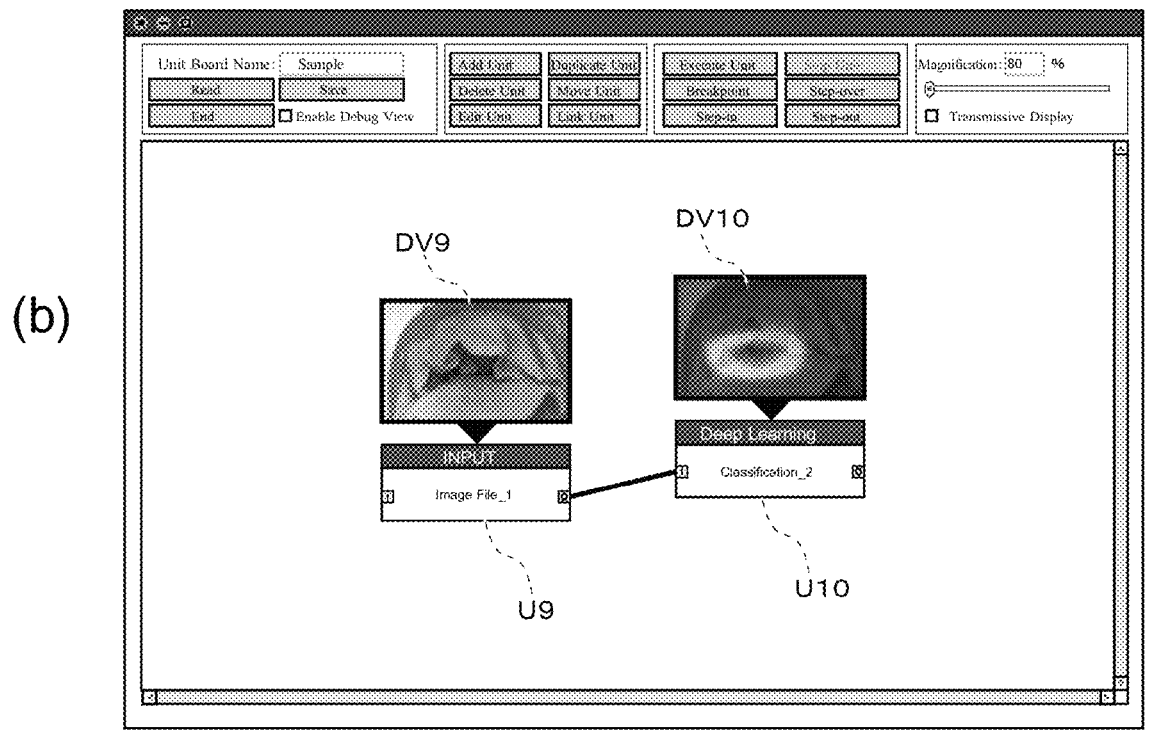

FIG. 15 shows still another example of the unit board programmed using the programming device 10. Each of FIGS. 15(a) and 15(b) shows a display example of the debug view DV in an inference unit based on learned data from deep learning.

In the example shown in FIG. 15(a), the unit U8, which is an inference unit based on learned data from deep learning, classifies inspection images (in this example, a mixture of still images of normally formed dumplings and abnormally formed dumplings), provided from the unit U7 as input images, into classes for appearance inspection. In the debug view DV8 of the unit U8, the ranking (the numerical numbers indicating the order of the classes in descending order of likelihood of being relevant) and the estimated probabilities (likelihood of being relevant) of each class are displayed as a list through the class classification of the ranking and the estimated probabilities from the inference based on the display. The display of such debug view allows the user to adjust each unit configuring the algorithm while checking the inference result from deep learning, i.e., not only the class with the highest likelihood of being relevant but also classes with a lower likelihood of being relevant (the lower-ranked classes). Further, such inference result may be linked to a unit in a subsequent stage to allow for further image processing and utilization of the determination result.

In the example shown in FIG. 15(b), given a still image of the dumplings from the unit U9 as an input image, the inference unit U10 based on learned data from deep learning displays, in the debug view DV10, a heat map that indicates a portion viewed as a feature by a neural network. The heat map is superimposed on the input image and displayed in a semi-transmissive manner. Although the drawings are shown in monochrome, the increase or decrease in the amount of the feature may actually be expressed in color. More specifically, the feature portion may be displayed in color in a gradation form from blue to red in accordance with the amount of the feature. The display of such debug view allows the user to visual check the portion viewed as a feature (in this example, defective goods such as dumplings with holes in the coating dough and dumplings with meat sticking out) in the inference by the deep learning, quickly check in real time whether the learning of the deep learning has achieved the target as intended, and adjust each unit configuring the algorithm. If it can be determined that learning is not working out well based on the display result of the heat map, re-learning can be immediately performed based on the result in the debug view.

As described above, according to the programming device 10, it is possible to easily create a complicated program including processing involving a plurality of inputs, such as addition and subtraction of images, and processing involving a plurality of outputs, such as conditional branching and separation, by means of a graphical programming method in which units are arranged and linked.

As described above, according to the programming device 10, the output of each unit arranged in the unit board editing region R2 can be checked at a glance and in real time in the debug view. Therefore, the validation of the program and the trial-and-error process of the variable adjustment can be performed efficiently.

Extension of Embodiments

While the present invention has been described with reference to the embodiments, the present invention is not limited to the above embodiments, and various changes which can be understood by those skilled in the art within the scope of the present invention can be made in the configuration and details of the present invention.

REFERENCES

10 . . . programming device
11 . . . communication I/F part
12 . . . operation input part
13 . . . screen display part
14 . . . storage part
15 . . . arithmetic processing part

The invention claimed is:

1. A programming device for editing a program by arranging icons of units, the unit representing a processing unit, and linking the units on an editing screen in response to a user operation, characterized in that the programming device comprises:
- a program execution circuit configured to execute a program defined by the units arranged and linked on the editing screen and to calculate an output of each unit; and
- a debug view display controller configured to display an output of each unit obtained by being calculated by the program execution circuit in a debug view region associated with an icon of each of the units arranged on the editing screen,
- wherein the programming device further comprises a unit editing circuit configured to accept a change in a setting value of each unit configuring the program,
- wherein the programming device is capable of utilizing a flexible image filter unit capable of selecting a plurality of types of image filters as the unit, and
- wherein the unit editing circuit accepts a setting of the flexible image filter unit by a user through a setting screen including:
  - a first preview region configured to display a list of preview images obtained if each of a plurality of selectable types of image filters is applied to input data in such a manner that a preview image to which a selected image filter is applied is observable;
  - a second preview region configured to display a list of preview images obtained if a plurality of settable setting values is applied regarding a characteristic parameter related to an image filter selected from the image filters in such a manner that a preview image to which a set setting value is applied is observable; and
  - a target image display region configured to display a target image, which is a preview image obtained if a selected image filter is applied to input data with a set setting value of a characteristic parameter, the target image being displayed larger than the respective preview images displayed in the first preview region and the second preview region.

2. The programming device according to claim 1, wherein the units configuring the program are selectable from a plurality of options including an input to the programming device, an output from the programming device, conditional branching, and inference based on learned data from deep learning.

3. The programming device according to claim 1, wherein the debug view display controller updates the display in the debug view region in real time in response to a change in the output of each unit while the program execution circuit executes the program.

4. The programming device according to claim 1, wherein the debug view display controller displays, in the debug view region, a heat map that indicates a portion viewed as a feature by inference for a unit that performs inference based on the learned data from deep learning.

5. The programming device according to claim 1, wherein the unit editing circuit is capable of accepting a change in a setting value of a unit while the program execution circuit is executing the program, and
- the program execution circuit reflects, as needed, the change in the setting value accepted by the unit editing circuit during the execution of the program to the calculation in the program being executed.

6. A non-transitory computer readable medium storing a program causing a computer to function as the programming device according to claim 1.

* * * * *